Oct. 24, 1961  K. K. MUSE  3,005,260
ROLL CUTTER
Filed June 24, 1960

Kenneth K. Muse
INVENTOR.

BY *Clarence A. O'Brien*
*and Harvey B. Jacobson*
Attorneys

United States Patent Office 3,005,260
Patented Oct. 24, 1961

3,005,260
ROLL CUTTER
Kenneth K. Muse, 504 S. Broadway, Cortez, Colo.
Filed June 24, 1960, Ser. No. 38,476
7 Claims. (Cl. 30—302)

This invention relates to a dough cutter for cutting in particular, rolls of the section type.

It is therefore a primary object of this invention to provide a dough cutter for cutting "Parkerhouse" type of rolls and "Cloverleaf" type of rolls by use of a single cutter implement.

The type of rolls which may be baked from the dough cut by the cutter implement of this invention are those that are made up of separate sections interconnected at the bottom whereby the roll sections may be separated for insertion therebetween of butter and also for ensuring even distribution of heat through the dough as the rolls are being baked. The rolls having two sections are generally known as "Parkerhouse" rolls while those having three sections are generally known as "Cloverleaf" rolls. The cutting implement in accordance with this invention, may cut both types of rolls depending upon which end of the implement is inserted into the dough for cutting thereof. The implement is therefore made up of a cylindrical tubular member each end of which has thin edges for cutting of cylindrical rolls from a long rolled out length of dough of three quarters to one inch thick. Disposed within the cylindrical cutter adjacent each end thereof are blades arranged to cut or define the roll sections when the roll is cut out of the length of dough by the circular cutting edge of the tubular cutter implement. Accordingly, the blade is recessed along its length so that each section of the roll will be cut thereby and yet leave a connecting portion at the bottom of the roll for holding the sections together while baking. The recess portions also include notches which leave pillars of dough between the dough sections in order to better connect the roll sections so as to prevent separation of the sections while the rolls are being handled prior to baking thereof. One end of the cylindrical cutter implement has a single blade arranged to define two sections for sectioning of a "Parkerhouse" roll. The other cylindrical cutter implement has three radially disposed blades for defining three equally angular sections when cutting of "Cloverleaf" rolls from the dough.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4:
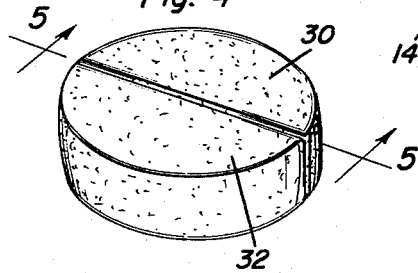
FIGURE 4 is a perspective view of the dough cut by the cutter implement for forming a two section type roll.

Referring to the drawing in detail, it will be observed that the cutter implement generally indicated by the reference numeral 10 includes a tubular, cylindrical member 12 formed of a thin rigid material so that the circular end edges 14 and 16 thereof may cut a cylindrical roll such as illustrated in FIGURE 4.

Figure 1:
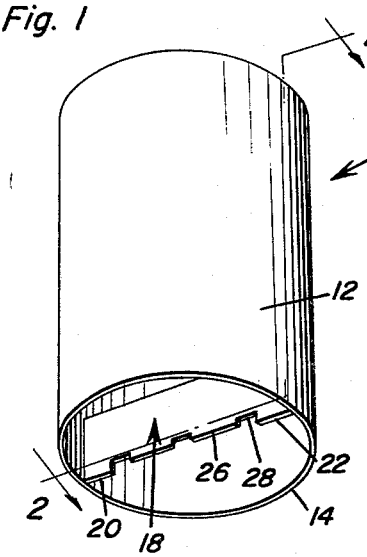
FIGURE 1 is a perspective view of the cutter implement showing one end thereof with a blade for cutting a two section type roll.
Figure 2:
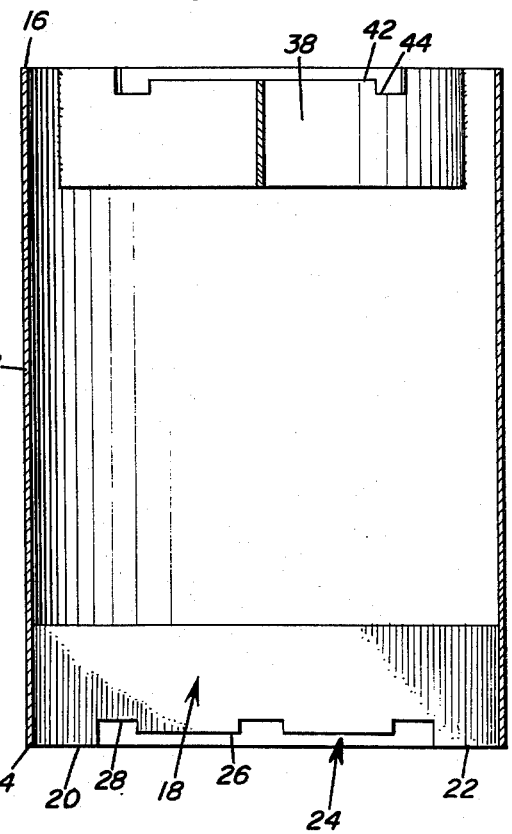
FIGURE 2 is a sectional view taken through a plane indicated by section line 2—2 in FIGURE 1.

In FIGURES 1 and 2 it will be observed that a blade generally indicated by reference numeral 18 is disposed at one end of the tubular member 12 for the purpose of cutting and forming two sections of a "Parkerhouse" type of roll as shown in FIGURE 4. The blade 18 has a pair of section cutting edges 20 and 22 which are attached to the inner walls of the cylindrical member 12 in any convenient manner, said section cutting edges 20 and 22 being in the same plane as the peripheral roll cutting edge 14. A recess portion 24 is disposed between the edges 20 and 22, said recess 24 forming upper cutting edges 26 which will surface section the dough and yet leave at the bottom of the roll a connecting portion for holding the roll sections together.

It will be recognized, however, that while handling of the rolls in their dough state, the sections may become readily separated for which reason a plurality of notches 28 are provided within the recess 24 of the blade 18 for the purpose of defining pillars of dough between the dough include sections 30 and 32 which are held together with the requisite cohesion during handling of the rolls prior to baking thereof.

Figure 5:
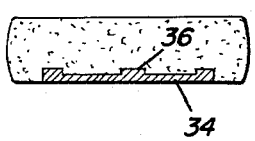
FIGURE 5 is a sectional view taken through a plane indicated by section line 5—5 in FIGURE 4.

Referring to FIGURES 4 and 5 therefore, it will be observed that the two section type of rolls cut from the dough include sections 30 and 32 which are held together at the bottom by means of a connecting portion 34 as seen in FIGURE 5 while pillars of dough 36 also connect the sections together, the connecting portion 34 and dough pillars 36 being defined by the recess edges 26 and notches 28 respectively on the cutter blade 18. The reason for forming pillars of dough 36 rather than increasing the height of the connecting portion 34 is to prevent the sections from being obliterated during baking of the rolls because of a large connecting portion.

Figure 3:
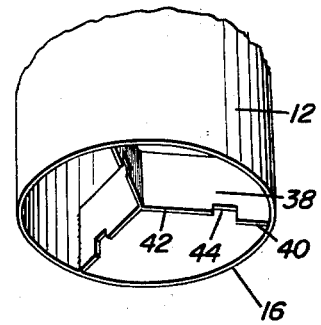
FIGURE 3 is a partial perspective view showing the other end of the cutter implement including the blade means for cutting a three section type roll.

Referring now to FIGURES 2 and 3, it will be observed that the other end of the tubular member 12 has mounted therein three blade sections 38 each being angularly spaced from each other an equal amount and interconnected at their inner ends to each other, their outer ends being attached to the inner walls of the cylindrical member 12. Each of the blade sections 38 is provided with a section cutting edge 40 and a recess edge 42 within which is formed a notch 44 for purposes similar to those discussed with respect to notches 28. It will be apparent therefore that the cutter blade sections 38 together with the peripheral cutting edge 16 may cut from the dough a three sectioned or "Cloverleaf" type of roll. The latter type roll will be cut with the same efficiency and advantages as discussed with respect to the two section type of roll.

From the foregoing description, it will be observed that different types of section rolls may be quickly and efficiently cut from the dough with a single implement. It will also be recognized that the rolls so cut may be handled without separation of the roll sections prior to baking and yet so cut that the sections will not be obliterated during the baking process. Accordingly, the rolls may be cut with great speed and may be handled faster and more easily than was heretofore possible. Also, as a result of the novel sectioning blade configuration, the roll sections may be more easily opened because of the deep cut of the sectioning blade and yet permit easy handling of the rolls in their dough state because of the pillars of dough connecting the roll sections formed by the notches within the recesses of the sectioning blades.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A dough cutter for sectioned rolls comprising, a tubular member having peripheral roll cutting edge means at, at least, one end thereof, roll sectioning means disposed at said one end of the tubular member comprising at least one blade means, each blade means including a section cutting edge portion in a plane with said edge means, said edge portion being secured to said tubular member and extending radially inward therefrom, said blade means also including a surface section defining recess means extending axially and radially inward from the section cutting edge portion for defining a roll section connecting portion, said recess means including notch means extending further axially inward from the recess means to define a section connecting pillar.

2. A dough cutter for sectional rolls comprising, a tubular member having peripheral roll cutting edge means at, at least, one end thereof, roll sectioning means disposed at said one end of the tubular member comprising at least one blade means, each blade means including a section cutting edge portion in a plane with said edge means, said edge portion being secured to said tubular member and extending radially inward therefrom, said blade means also including a surface section defining recess means extending axially and radially inward from the section cutting edge portion for defining a roll section connecting portion, said roll sectioning means at said one end of the tubular member consisting of a single diametrically positioned blade means, said recess means including notch means extending further axially inward from the recess means to define a section connecting pillar.

3. The combination of claim 2, wherein said notch means includes notches formed within the recess means adjacent to each section cutting edge portion and a centralling disposed notch spaced from said first-mentioned notches.

4. A dough cutter for sectioned rolls comprising, a tubular member having peripheral roll cutting edge means at, at least, one end thereof, roll sectioning means disposed at said one end of the tubular member comprising at least one blade means, each blade means including a section cutting edge portion in a plane with said edge means, said edge portion being secured to said tubular member and extending radially inward therefrom, said blade means also including a surface section defining recess means extending axially and radially inward from the section cutting edge portion for defining a roll section connecting portion, said roll sectioning means at said one end of the tubular member consisting of a plurality of radial interconnected blade means, said recess means including notch means extending further axially inward from the recess means to define a section connecting pillar.

5. The combination of claim 4, wherein said notch means includes notches formed within the recess means adjacent to each section cutting edge portion.

6. A dough cutter for sectioned rolls, comprising, tubular cutting means for peripherally separating from a sheet of dough, a disc of dough, section edge cutting means operatively connected to the tubular cutting means for simultaneously forming a section defining cut in the disc of dough, recessed surface sectioning means operatively connected to the section edge cutting means for forming a cleavage cut in the disc of dough in alignment with the section defining cut, and notch means formed in the recessed surface sectioning means for leaving connecting pillars of dough in the cleavage cut.

7. The combination of claim 6 wherein the section edge cutting means and the recessed surface sectioning means are radially aligned with respect to the tubular cutting means.

References Cited in the file of this patent

UNITED STATES PATENTS

| | | |
|---|---|---|
| 990,561 | Kandlbinder | Apr. 25, 1911 |
| 1,477,693 | Clark | Dec. 18, 1923 |
| 1,598,717 | Harding | Sept. 7, 1926 |
| 2,206,316 | Bartholomew | July 2, 1940 |
| 2,249,399 | Sojnaj | July 15, 1941 |
| 2,649,657 | Shaw | Aug. 25, 1953 |